United States Patent Office 3,754,052
Patented Aug. 21, 1973

3,754,052
ETHYLENE ALKYLATION RESULTING IN ALKYLATE WITH HIGH PROPORTION OF 2,3-DIMETHYLBUTANE
David M. Hoffman, Wilmington, Del., and Abraham Schneider, Lower Merion, Pa., assignors to Sun Research and Development Co., Philadelphia, Pa.
No Drawing. Filed Jan. 14, 1972, Ser. No. 217,954
Int. Cl. C07c 3/54
U.S. Cl. 260—683.61          16 Claims

ABSTRACT OF THE DISCLOSURE

An improved method for the preparation of 2,3-dimethylbutane admixed with a branched $C_8$ alkylate mixture by sulfuric acid alkylation is provided in a two-stage process wherein isobutylene and ethylene are co-dimerized in the presence of isobutane and sulfuric acid under reaction conditions which favor the formation of 3,3-dimethyl-1-butyl sulfate, and thereafter the said 3,3-dimethyl-1-butyl sulfate is reacted with the isobutane under conditions which favor the formation of 2,3-dimethylbutane. This process is advantageous in that it permits the incorporation of ethylene into a sulfuric acid alkylation reaction without the formation of large amounts of unwanted ethyl sulfate.

BACKGROUND OF THE INVENTION

This invention relates to the incorporation of ethylene into a sulfuric acid catalyzed alkylation process to form a branched $C_8$ alkylate mixture containing a high proportion of 2,3-dimethylbutane. More particularly, this invention relates to a method of first co-dimerizing ethylene and isobutene in the presence of isobutane and sulfuric acid catalyst to form 3,3-dimethyl-1-butyl sulfate, and thereafter reacting said sulfate with isobutane under alkylation conditions to form a product containing substantial amounts of 2,3-dimethylbutane. This latter product is, of course, especially useful as a motor fuel component.

U.S. Pat. No. 2,660,602 teaches a method of preparing branched primary sulfate esters by combining ethylene with another olefin in the presence of sulfuric acid catalyst. Included in this teaching is the reaction of ethylene with isobutene to form 3,3-dimethyl-1-butyl sulfate. However, nowhere in this patent is there the teaching or suggestion that this sulfate compound may advantageously be employed as an intermediate in the alkylation of isobutane to form 2,3-dimethylbutane.

U.S. Pat. 2,381,041 teaches that alkyl esters of polybasic mineral acids, such as sulfuric acid, can be reacted with branched chain paraffins to form alkylation products of the isoparaffin. This reference does not, however, teach the use of 3,3-dimethyl-1-butyl sulfate in the alkylation of isobutane to yield 2,3-dimethylbutane.

More significantly, neither of the above references teaches alone or in combination a solution to the longstanding problem of how to incorporate ethylene into a sulfuric acid-catalyzed alkylation reaction without forming substantial amounts of undesired ethyl sulfate, which latter compound cannot be utilized to alkylate an isoparaffin.

SUMMARY OF THE INVENTION

It has now been found, in accordance with the present invention, that ethylene may be employed in a sulfuric acid catalyzed alkylation reaction with an isoparaffin such as isobutane without forming large amounts of ethyl sulfate by-products. Such a process is highly advantageous in that ethyl sulfate, when formed in accordance with conventional processes cannot further react with the isoparaffin to alkylate the same, and thus large amounts of ethylene are lost.

The process of the present invention achieves the incorporation of ethylene into an alkylation reaction while at the same time substantially avoiding formation of unreactive ethyl sulfate by providing a novel two-stage alkylation reaction. In the first stage ethyelne is co-dimerized with a higher molecular weight olefin such as isobutene in the presence of sulfuric acid and the isoparaffin to be alkylated,, e.g. isobutane, under reaction conditions which favor the formation of a stable alkyl sulfate ester of the olefin co-dimer rather than the formation of ethyl sulfate. Thereafter, in the second stage the said alkyl sulfate ester of the co-dimer is reacted with the isoparaffin under conditions favoring hydride ion transfer of the co-dimer sulfuric acid ester with the isoparaffin, followed by subsequent self-alkylation of the isoparaffin. The product formed is predominantly a branched $C_8$ alkylated hydrocarbon fuel containing high proportions of 2,3-dimethylbutane.

DESCRIPTION OF THE INVENTION

The process will now be described with particular reference to the use of ethylene, isobutene and isobutane to form an alkylate containing a high proportion of 2,3-dimethylbutane (hereinafter "2,3-DMB").

In the first stage isobutylene is desirably introduced slowly into an emulsion of sulfuric acid and isobutane at temperatures of from about $-10°$ to $12°$ C., and preferably not more than about $0°$ C., in a reactor that is pressured with ethylene, preferably at a pressure of about 60 to 80 p.s.i. The product is chiefly 3,3-dimethyl-1-butyl sulfate, a stable, recoverable sulfate ester of the ethylene-isobutylene co-dimer. Under these reaction conditions only slight amounts of ethyl sulfate formation or alkylation of the isobutane take place.

The mole ratio of ethylene to isobutylene in this stage may be in the range of 1:1 to 100:1 and is preferably 5:1 to 25:1. It will be understood that the ratio of the two olefins is more critical than that of the isobutane, which is merely acting as a diluent in this first stage to prevent oligomerization. Thus, it is only necessary that the isobutane be present in volume amounts sufficient for that purpose, preferably, although not essentially, in the range of from 2:1 to 25:1 based on total volume of olefin employed.

In this first stage, the sulfuric acid employed as the catalyst should have a concentration of about 95 to 100 weight percent. The volume of such catalyst present in the first stage reaction medium should be equal to that of the total volume of hydrocarbons present, although the ratio of acid volume to hydrocarbon may range from about 0.25:1 to 10:1.

The co-dimerization reaction is generally rapid, and in any event the reaction is substantially completed in about 1 to 15 minutes after the addition of the olefin is complete.

For purposes of this process, it is not essential that the co-dimer sulfate ester be separated and recovered before the second stage alkylation. Instead, the temperature of the total reaction mixture comprising some unreacted ethylene, an acid phase containing principally said sulfate ester, and a hydrocarbon phase containing principally isobutane and additional unreacted ethylene may be elevated, following venting of the ethylene, to about $25°$ C. and preferably from about 35 to $50°$ C., whereupon said sulfate ester will alkylate with said isobutane to form the desired product. Alternatively, and more desirably, however, the acid phase containing said sulfate ester is first separated from the hydrocarbon phase and thereafter reacted with fresh isobutane at the aforesaid elevated temperature.

In the second stage the mole ratio of co-dimer sulfuric acid ester to isobutane reactant should desirably be in the range of 1:1 to 1:25 and preferably 1:4 to 1:10. The initial sulfuric acid catalyst concentration should be maintained at the same concentration and volume as in the first stage, if necessary by the introduction of small amounts of additional acid. The time necessary to complete the alkylation will range from 10 to 120 minutes, and generally about 60 minutes, depending principally upon the temperature employed.

In both stages, as in conventional alkylation processes, vigorous agitation of the acid and hydrocarbon phases should be maintained throughout the reaction. Any known agitation means may be employed.

As aforestated, the product comprises 2,3-dimethylbutane admixed with a $C_8$ alkylate mixture, although small amounts of $C_5$ to $C_7$ branched hydrocarbons may also be recovered, as for example methylpentanes, methylhexanes and the like.

In a further embodiment of this process, it has been found that other olefins can be substituted for isobutylene. In such a substitution the stable sulfate ester formed in the first stage is a mixture of olefin/ethylene co-dimer sulfate ester and 3,3-dimethyl-1-butyl sulfate which is formed from the t-butyl cation (by hydride extraction from isobutane) and ethylene. In addition to 2,3-dimethylbutane, the final product contains large amounts of isopentane when the olefin is propylene; considerable amounts of 3-methylpentane when the olefin is butene-1 or butene-2; and large amounts of 2,3-dimethylbutane when the olefin is 2,3-dimethylbutene. In the last case, the 2,3-dimethylbutane is formed both by initial hydride extraction in the first stage and by reaction of the t-butyl cation/ethylene co-dimer sulfate ester with isobutane in the second stage.

Example 1

Into a 1-liter stirred Parr reactor equipped with cooling coils was placed 200 cc. of 96 percent $H_2SO_4$, 2.0 cc. of n-octane (internal standard) and 150 cc. of isobutane. The contents of the reactor were cooled to −8 to −9° C. by circulating cold acetone through the cooling coils and the pressure of the reactor brought to 80 p.s.i. with ethylene and maintained between 60 to 80 p.s.i. with ethylene throughout the reaction. Isobutylene (21.5 g.) dissolved in 100 cc. of isobutane was added to the vapor space through a needle over a period of 25 minutes. Following the butylene addition the ethylene pressure was vented and a sample of the hydrocarbon layer was taken for VPC analysis. The temperature of the reactor was quickly raised to 35° C. by circulating warm water through the coils and the reaction continued for 2 hours with samples of the hydrocarbon being taken at 1-hour intervals. These samples had the following analysis:

Isobutylene-isobutane alkylation in the presence of 60–80 p.s.i. of ethylene −8 to −9° C.

| | Time at 35° C. (min.) | | |
|---|---|---|---|
| | 0 | 60 | 120 |
| Alkylate yield (wt. percent based on $iC_4$) | 28 | 239 | 396 |
| Alkylate composition (wt. percent): | | | |
| $iC_5$ | 3.1 | 9.2 | 10.6 |
| 2,2-dimethylbutane | 1.3 | 0.2 | 0.1 |
| 2,3-dimethylbutane | 6.4 | 33.4 | 31.3 |
| 2-methylpentane | 0.5 | 1.7 | 2.3 |
| 3-methylpentane | 2.5 | 0.9 | 1.1 |
| 2,4-dimethylpentane | 2.0 | 2.1 | 2.0 |
| 2,2,3-trimethylbutane | 0.9 | 0.2 | 0.1 |
| 2-methylhexane | | 0.2 | 0.2 |
| 2,3-dimethylpentane | 1.7 | 1.5 | 1.3 |
| 3-methylhexane | | 0.1 | 0.2 |
| 2,2,4-trimethylpentane | 10.9 | 16.4 | 16.9 |
| 2,2-dimethylhexane | | | 0.2 |
| 2,5-dimethylhexane | 1.7 | 2.9 | 2.9 |
| 2,4-dimethylhexane | 1.5 | 2.3 | 2.3 |
| 2,2,3-trimethylpentane | 0.5 | 0.9 | 0.8 |
| 2,3,4-trimethylpentane | 3.7 | 6.8 | 6.0 |
| 2,3,3-trimethylpentane | 4.2 | 5.8 | 6.0 |
| 2,3-dimethylhexane | 2.2 | 1.8 | 1.6 |
| 3,4-dimethylhexane | 2.0 | 0.3 | 0.3 |
| 2,2,5-trimethylhexane | | 3.2 | 3.6 |
| $C_9+C_{10}$ | 10.4 | 4.1 | 4.6 |
| $C_{10}$ plus | 44.4 | 6.1 | 5.8 |

What is claimed is:

1. A process for the preparation of a branched-chain hydrocarbon motor fuel which includes a high proportion of 2,3-dimethylbutane, said process comprising contacting ethylene with isobutylene in the presence of isobutane and concentrated sulfuric acid catalyst at a temperature of from about −10 to 12° C. to form a reaction mixture comprising unreacted ethylene, an acid phase containing 3,3-dimethyl-1-butyl acid sulfate ester, and a hydrocarbon phase containing isobutane, removing unreacted ethylene from said reaction mixture and thereafter raising the temperature of said reaction mixture to at least about 25° C. in order to alkylate said sulfate ester with said isobutane, and recovering a predominantly branched $C_8$ alkylate fuel containing a high proportion of 2,3-dimethylbutane.

2. The process according to claim 1 wherein the ethylene is maintained in contact with the isobutylene at a pressure of from about 60 to 80 p.s.i.

3. The process according to claim 1 wherein the mole ratio of ethylene to isobutylene is from about 1:1 to 100:1.

4. The process according to claim 1 wherein acid catalyst is present in the reaction medium in a ratio of about 0.25:1 to 10:1 by volume based on the volume of hydrocarbon present.

5. The process according to claim 1 wherein the volume ratio of isobutane solvent to total volume of olefin is from about 2:1 to 25:1.

6. The process according to claim 1 wherein the mole ratio of sulfate ester to isobutane reactant is from about 1:1 to 1:25.

7. The process according to claim 1 wherein the contact time between the sulfate ester and the isobutane reactant is between about 10 and 120 minutes.

8. A process for preparing a branched-chain hydrocarbon motor fuel which includes a high proportion of 2,3-dimethylbutane, said process comprises contacting ethylene with an olefin selected from the group consisting of propylene, butene-1, butene-2, and 2,3-dimethylbutene in the presence of isobutane and concentrated sulfuric acid catalyst at a temperature of from about −10 to 12° C. to form a reaction mixture comprising unreacted ethylene, an acid phase containing a mixture of a co-dimer acid sulfate ester and 3,3-dimethyl-1-butyl acid sulfate ester, and a hydrocarbon phase containing isobutane and unreacted ethylene, said co-dimer in said sulfate ester comprising said ethylene co-dimerized with said olefin, removing unreacted ethylene, and thereafter raising the temperature of the reaction mixture to at least about 25° C. in order to alkylate said sulfate esters with said isobutane, and recovering a predominantly branched $C_8$ alkylate fuel containing a high proportion of 2,3-dimethylbutane.

9. The process according to claim 8 wherein the ethylene is maintained in contact with the olefin at a pressure of from about 60 to 80 p.s.i.

10. The process according to claim 8 wherein the mole ratio of ethylene to olefin is from about 1:1 to 100:1.

11. The process according to claim 8 wherein acid catalyst is present in the reaction medium in a ratio of about 0.25:1 to 10:1 by volume based on the volume of hydrocarbon present.

12. The process according to claim 8 wherein the volume ratio of isobutane solvent to total volume of olefin is from about 2:1 to 25:1.

13. The process according to claim 8 wherein the mole ratio of sulfate esters to olefin reactant is from about 1:1 to 1:25.

14. The process according to claim 8 wherein the contact time between the sulfate esters and the isobutane reactant is between about 10 and 120 minutes.

15. A process for the preparation of a branched-chain hydrocarbon motor fuel which includes high a proportion of 2,3-dimethylbutane, said process comprising contacting ethylene with isobutylene in the presence of isobutane and concentrated sulfuric acid catalyst at a temperature of from about −10 to 12° C. to form a reaction mixture comprising unreacted ethylene, an acid phase containing 3,3-dimethyl-1-butyl acid sulfate ester, and a hydrocarbon phase containing isobutane, removing unreacted ethylene from said reaction mixture, phase separating the acid phase containing said acid sulfate ester from the hydrocarbon phase, thereafter reacting said acid phase with isobutane at a temperature of at least about 25° C. in order to alkylate said sulfate ester with said isobutane, and recovering a predominantly branched $C_8$ alkylate fuel containing a high proportion of 2,3-dimethylbutane.

16. A process for preparing a branched-chain hydrocarbon motor fuel which includes a high proportion of 2,3-dimethylbutane, said process comprises contacting ethylene with an olefin selected from the group consisting of propylene, butene-1, butene-2, and 2,3-dimethylbutene in the presence of isobutane and concentrated sulfuric acid catalyst at a temperature of from about −10 to 12° C. to form a reaction mixture comprising unreacted ethylene, an acid phase containing a mixture of a co-dimer acid sulfate ester and 3,3-dimethyl-1-butyl acid sulfate ester, and a hydrocarbon phase containing isobutane and unreacted ethylene, said co-dimer with said olefin, removing unreacted ethylene from said reaction mixture, phase separating the acid phase containing said acid sulfate ester from the hydrocarbon phase, thereafter reacting said acid phase with isobutane, at a temperature of at least about 25° C. in order to alkylate said sulfate esters with said isobutane, and recovering a predominantly branched $C_8$ alkylate fuel containing a high proportion of 2,3-dimethylbutane.

References Cited

UNITED STATES PATENTS

| 2,314,333 | 3/1943 | Francis | 260—683.61 |
| 2,319,209 | 5/1943 | Carmody | 260—683.59 |
| 2,660,602 | 11/1953 | Wiese | 260—460 |

DELBERT E. GANTZ, Primary Examiner

G. J. CRASANAKIS, Assistant Examiner

U.S. Cl. X.R.

260—460